United States Patent

Nagai et al.

[11] Patent Number: 5,779,312
[45] Date of Patent: Jul. 14, 1998

[54] BACK-REST ANGLE ADJUSTING APPARATUS

[75] Inventors: Tomoyuki Nagai, Kamiyamada-machi; Eizi Sunohara, Nagano; Toshihiko Hidaka, Aichi, all of Japan

[73] Assignees: Kayaba Kogyo Kabushiki Kaisha, Tokyo; Kabushiki Kaisha Yanagisawa Seiki Seisakusho, Nagano; Koito Industries Ltd., Kanagawa, all of Japan

[21] Appl. No.: 773,970

[22] Filed: Dec. 26, 1996

[30] Foreign Application Priority Data

Aug. 6, 1996 [JP] Japan .................. 8-197991

[51] Int. Cl.$^6$ .................. B60N 2/02
[52] U.S. Cl. .................. 297/362.13
[58] Field of Search .................. 297/362.13

[56] References Cited

U.S. PATENT DOCUMENTS

| 2,630,887 | 3/1953 | Paquin | 297/362.13 X |
| 3,284,135 | 11/1966 | Hiramatsu | 297/362.13 |
| 3,533,658 | 10/1970 | Gropp | 297/362.13 |
| 3,744,844 | 7/1973 | Nomaki et al. | 297/362.13 |
| 5,102,193 | 4/1992 | Goss et al. | 297/362.13 |

FOREIGN PATENT DOCUMENTS

| 2134746 | 1/1973 | Germany | 297/362.13 |
| 2223555 | 11/1973 | Germany | 297/362.13 |
| 272825 | 6/1970 | U.S.S.R. | 297/362.13 |
| 676254 | 7/1952 | United Kingdom | 297/362.13 |
| 956606 | 4/1964 | United Kingdom | 297/362.13 |
| 1639131 | 8/1966 | United Kingdom | 297/362.13 |

*Primary Examiner*—José V. Chen
*Assistant Examiner*—Rodney B. White
*Attorney, Agent, or Firm*—McGlew and Tuttle

[57] ABSTRACT

Irrespective of limitation of a back-rest operating speed of a in a normal angle range, a raising speed of the back-rest in the case where the back-rest is greatly raised forward beyond the angle adjusting range is made faster. A back-rest angle adjusting apparatus 1 for a seat of a cylinder type in which an enlarged diameter portion 37 is constituted in an inner wall portion of a cylinder 2 opposed to a piston 16 in the vicinity of said back-rest angle adjusting apparatus 1, a bypass passage 38 is formed between the inner wall of the cylinder 2 and the outer periphery of the piston 16 when the enlarged diameter portion 37 on the cylinder 2 side is opposed to the piston 16, and a rod side chamber R and a head side chamber H within the cylinder 2 defined by the piston 16 are caused to communicate with each other by said bypass passage 38.

9 Claims, 4 Drawing Sheets

BACK-REST ANGLE ADJUSTING APPARATUS

FIELD OF THE INVENTION

This invention relates to a back-rest angle adjusting apparatus of a cylinder type suitable for adjusting an angle of a back-rest for a seat, in a direction changeable (turning type) reclining seat used for railway vehicles for the Shinkansen Line and existing special expresses and motor vehicles for recreation, or in reclining seats arranged in plural rows irrespective of any turning type.

BACKGROUND OF THE INVENTION

In the back-rest angle adjusting apparatus of a cylinder type heretofore generally used, a piston carrying a piston rod is slidably inserted into a cylinder so that the interior of the cylinder is defined by the piston into two working chambers, i.e., a rod side chamber and a head side chamber filled with working oil.

On the other hand, a free piston is slidably arranged in the working chamber positioned on the head side, a part of the working chamber on the head side is defined as a gas chamber by said free piston, and an opening and closing valve is provided to continue and discontinue the communication between two working chambers, i.e., the rod side chamber and the head side chamber, with respect to the piston.

The back-rest angle adjusting apparatus constructed as described above is interposed between the seat and the back-rest using mounting members provided on the proximal end of the cylinder and the outer projecting end of the piston rod.

Thus, the opening and closing valve provided on the piston is operated to be opened and closed by an operating rod inserted through the piston rod from outside whereby the relative position of the cylinder and the piston is rendered changeable to expand or compress the back-rest angle adjusting apparatus and to lock the latter at a desired expansion or compression position so as to adjust the angle of the back-rest.

That is, according to the above-described arrangement, when an occupant operates the operating rod while pushing the back-rest by the back in the state where the occupant is seated to open the opening and closing valve, the back-rest angle adjusting apparatus is operated on the compressed side so that the back-rest is laid down backward.

When the back-rest is inclined to the desired angle, the operation of the operating rod is released. Then, the back-rest angle adjusting apparatus is locked and the back-rest stops while keeping the desired angle.

Conversely, in the case where the back-rest is raised forward, the opening and closing valve is opened by the operating rod in the state where the back is separated from the back-rest. Then, the back-rest angle adjusting apparatus is automatically operated toward the expansion side by the gas pressure in the gas chamber to raise the back-rest.

Also in this case, when the back-rest is raised to the desired angle, the operation of the operating rod is released to close the opening and closing valve. Then, the back-rest angle adjusting apparatus is locked and the back-rest stops while keeping the desired angle.

However, when at the time of the back-rest angle adjustment, the operation resistance in the case where the back-rest is tilted or raised against the gas pressure in the gas chamber or by the gas pressure as the opening and closing gas opens is small, the tilting and raising speed of the back-rest is so fast that the fine adjustment of the back-rest angle is difficult.

To overcome this, it is ordinary that an orifice is provided on the midway of the passage passing the opening and closing valve of the back-rest angle adjusting apparatus so that the flow resistance is applied by the orifice to the flow of working oil passing through the opening and closing valve to keep large the resistance of the expansion and compression operation of the back-rest angle adjusting apparatus so as to impart the restriction to the tilting and raising speed of the back-rest.

Therefore, in the case where the back-rest angle adjusting apparatus as described is used for the turning type reclining seat or the reclining seats arranged in plural rows, there occurs inconveniences as described below.

That is, in the turning type reclining seat using the back-rest angle adjusting apparatus of the cylinder type of this kind, generally, the back-rest is raised further forward from a preferable angle position when most raised in the normal angle adjusting range to release the turning lock of the seat, in which state the seat is turned in the horizontal direction to change the direction.

Also in the case where a plurality of rows of reclining seats are arranged for use irrespective of the presence of the turning type as described above, it is desired that the back-rest is raised to an upright position from the preferable angle position when most raised in the normal back-rest angle adjusting range to provide a large passage width between the front seat and the rear seat thereby facilitating cleaning of the passage between the seats.

Therefore, in the reclining seats of the turning type or the plural-row system, it is necessary to inevitably take large an angle of the back-rest on the raised side as compared with the normal reclining seat As a result, if the conventional back-rest angle adjusting apparatus of the cylinder type is used for the reclining seats of the turning type or the plural-row system, there poses a problem in that it takes much time to raise the back-rest subjected to restriction of the raising speed to an upright end position beyond the preferable angle position when most raised, thus failing to enhance efficiency of the turning operation and cleaning work.

SUMMARY OF THE INVENTION

It is therefore an object of the present invention to provide a back-rest angle adjusting apparatus of a cylinder type capable of making high a raising speed, in the case where the back-rest is raised further forward beyond a preferable angle position when most raised irrespective of limitation of the back-rest tilting and raising speed, to quickly raise the back-rest to an upright end position.

The above-described object of this invention is achieved by a first feature of the invention which provides a back-rest angle adjusting apparatus for a seat of a cylinder type in which an enlarged diameter portion is constituted in an inner wall portion of a cylinder opposed to a piston in the vicinity of an expansion of said back-rest angle adjusting apparatus, a bypass passage is formed between the inner wall of the cylinder and the outer periphery of the piston when the enlarged diameter portion on the cylinder side is opposed to the piston, and a rod side chamber and a head side chamber within the cylinder defined by the piston are caused to communicate with each other by said bypass passage.

The above-described object of this invention is achieved also by a second feature of the invention which provides a back-rest angle adjusting apparatus for a seat of a cylinder type in which two one-way seal members having a seal function are juxtaposed in a spaced relation from outward to inward on the outer peripheral surface of a piston, an enlarged diameter portion is constituted in an inner wall portion of a cylinder opposed to the seal member positioned on the rod side out of these two seal members in the vicinity of an expansion end of the back-rest angle adjusting apparatus, a bypass passage is formed between the inner wall of the cylinder and the seal member on the rod side of the piston when the enlarged diameter portion on the cylinder side is opposed to the seal member on the rod side of the piston, and a rod side chamber in the cylinder defined by the piston is caused to communicate with a head side chamber in the cylinder through the seal member on the head side of the piston from said bypass passage.

The above-described object of this invention is achieved further effectively also by a third aspect of the invention which provides an arrangement wherein a seal member and an intermediate chamber are juxtaposed from a rod side to a head side in the outer periphery of a piston, said intermediate chamber being communicated with a head side chamber in a cylinder defined by the piston through a restrictive orifice provided in the piston, an enlarged diameter portion is constituted in an inner wall portion of the cylinder opposed to a seal member of the piston in the vicinity of an expansion end of the back-rest angle adjusting apparatus, a bypass passage is formed between the inner wall of the cylinder and the seal member of the piston when the enlarged diameter portion on the cylinder side is opposed to the seal member of the piston, and a rod side chamber and a head side chamber in the cylinder defined by the piston are caused to communicate with each other through said bypass passage, and the intermediate chamber and the restrictive orifice provided in the piston.

Preferably, in the above-described inventions, in constituting the enlarged diameter portion in the inner wall portion in the vicinity of expansion end of the cylinder, a portion of the cylinder is over the entire periphery or partly inflated outward.

With this arrangement, in any of the aforementioned embodiments of the invention, in a normal back-rest angle adjusting range in which portions other than the enlarged diameter portion of the cylinder are expanded and compressed while slidably contacting the piston, the rod side chamber and the head side chamber in the cylinder are in the state defined by the piston.

Accordingly, when an opening and closing valve provided on the piston is operated to be opened and closed through an operating rod from outside, an angle of the back-rest is adjusted while limiting the tilting and raising speed by an orifice provided in a passage passing the opening and closing valve, in the same manner as the conventional back-rest angle adjusting apparatus.

On the other hand, in the case where the back-rest is raised or tilted between a preferable angle position when most raised in the normal back-rest angle adjusting range and an upright end position, the back-rest angle adjusting apparatus is expanded or compressed while the portion of the enlarged diameter portion formed in the cylinder being opposed to the piston.

Therefore, in the first embodiment of the invention, the bypass passage is formed to provide mutual communication between the rod side chamber and the head side chamber between the piston and the cylinder by the enlarged diameter portion on the cylinder side, and working oil moves between the rod side chamber and the head side chamber through the bypass passage irrespective of operation of the opening and closing valve.

As a result, within this range, even if the opening and closing valve remains closed, the back-rest is automatically stood up at faster speed than that of the normal back-rest angle adjusting range previously mentioned, or the back-rest is easily tilted by applying the external force thereto, enabling quick release of turning lock of the seat or widening operation of the passage between the seats.

Moreover, in returning the back-rest to the tilting direction, when the back-rest is returned to a preferable angle position when most raised in the normal back-rest angle adjusting range, the bypass passage is closed, at which angle position, the back-rest automatically stops.

In the second embodiment of the invention, as the bypass passage is formed, there is allowed a flow of working oil from the rod side chamber to the head side chamber while pushing-open the one-way seal member provided on the head side of the piston through the bypass passage.

Therefore, when the back-rest is raised forward beyond the preferable angle position when most raised in the normal back-rest angle adjusting range, the back-rest is stood upright at a faster speed than that of the normal back-rest angle adjusting time similar to the case of the first invention previously mentioned, enabling quick release of turning lock of the seat or widening operation of the passage between the seats.

In the second embodiment of the invention, however, in returning the back-rest toward the tilting side, the seal member on the head side provided on the piston impedes a flow of working oil from the head side chamber to the rod side chamber, unlike the case of the first embodiment of the invention previously mentioned.

From the foregoing, according to the second embodiment of the invention, even in the operating range in which the back-rest is returned to the preferable angle position when most raised in the normal back-rest angle adjusting range, the back-rest angle can be adjusted by operating the opening and closing valve provided on the piston from outside.

Moreover, in returning the back-rest, the original cylindrical portion of the cylinder other than the enlarged diameter portion enters from the back with respect to the seal member on the rod side of the piston. Therefore, the frictional resistance is kept small to prolong the service life of the seal member.

Further, in the third embodiment of the invention, when the bypass passage is formed between the inner wall of the cylinder and the seal member on the rod side of the piston by the enlarged diameter portion of the cylinder, the rod side chamber and the head side chamber in the cylinder are caused to communicate with each other through the intermediate chamber and the restrictive orifice provided in the piston from the bypass passage.

As described above, in the third embodiment of the invention, the rod side chamber and the head side chamber are not caused to communicate with each other merely by the bypass passage as in the first embodiment of the invention previously mentioned but they are caused to communicate with each other through the restrictive orifice provided in the piston from the intermediate chamber connected in series to the bypass passage.

Therefore, the angle of the back-rest is adjusted while controlling the raising and tilting speed of the back-rest to the desired value by the throttling resistance of the restrictive orifice and beyond the preferable angle position when most raised in the normal back-rest adjusting range, in the same manner as the first invention.

Furthermore, in constituting the enlarged diameter portion in the inner wall portion in the vicinity of expansion end of the cylinder, the inner wall portion of the cylinder is over the entire periphery or partly inflated whereby the enlarged diameter portion in the first, second and third embodiments of the invention can be easily prepared using means such as bulge processing.

DETAILED DESCRIPTION OF THE PREFERRED EMBODIMENTS

Preferred embodiments of the present invention will be described hereinafter with reference to the accompanying drawings.

Figure 1:
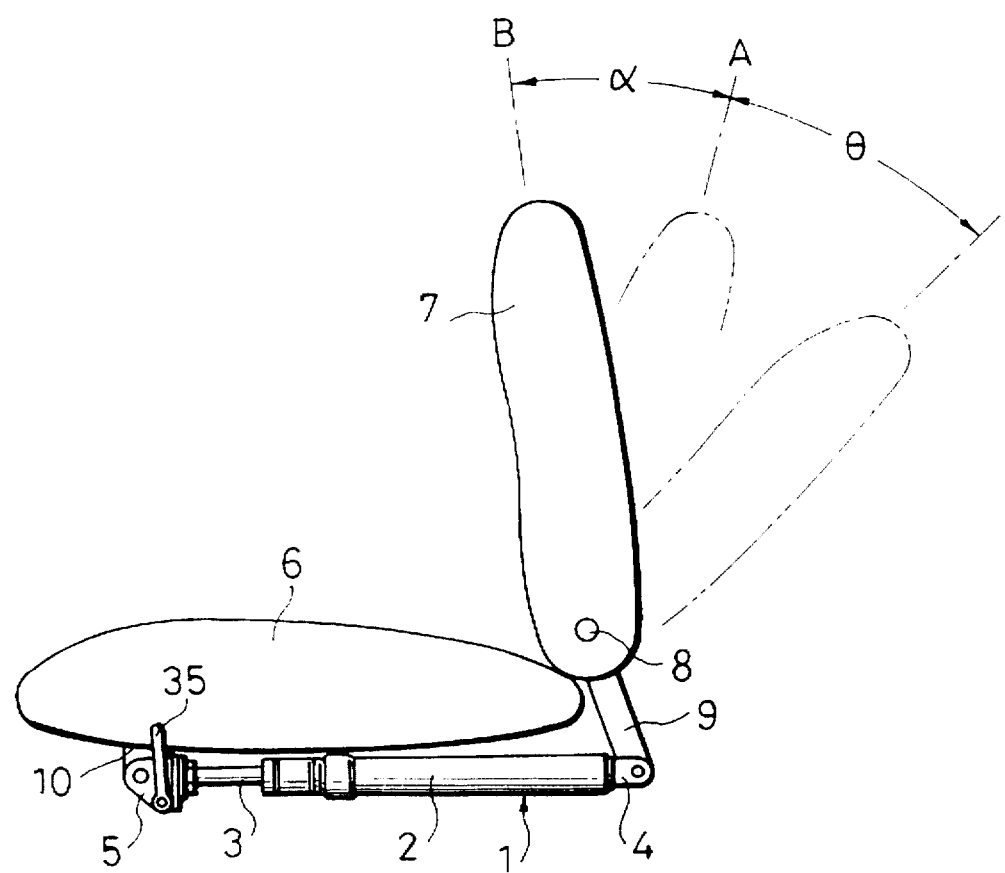
FIG. 1 is a view showing an example of mounting a back-rest angle adjusting apparatus to seat according to the present invention.

As shown in FIG. 1, a back-rest angle adjusting apparatus 1 for a cylinder type seat is provided with mounting members 4 and 5 at the proximal end of a cylinder and at the extreme end of a piston rod 3 telescopically inserted into the cylinder 2, respectively.

The mounting member 4 on the cylinder 2 side is connected to the extreme end of an arm 9 extending from a hinge 8 of the back-rest 7 in a seat 6.

On the other hand, the mounting member 5 on the piston rod 3 side is connected to a bracket 10 hung down from the seat 6.

With this, the back-rest angle adjusting apparatus 1 is mounted between the seat 6 and the back-rest 7 through the mounting members 4 and 5.

Figure 2:
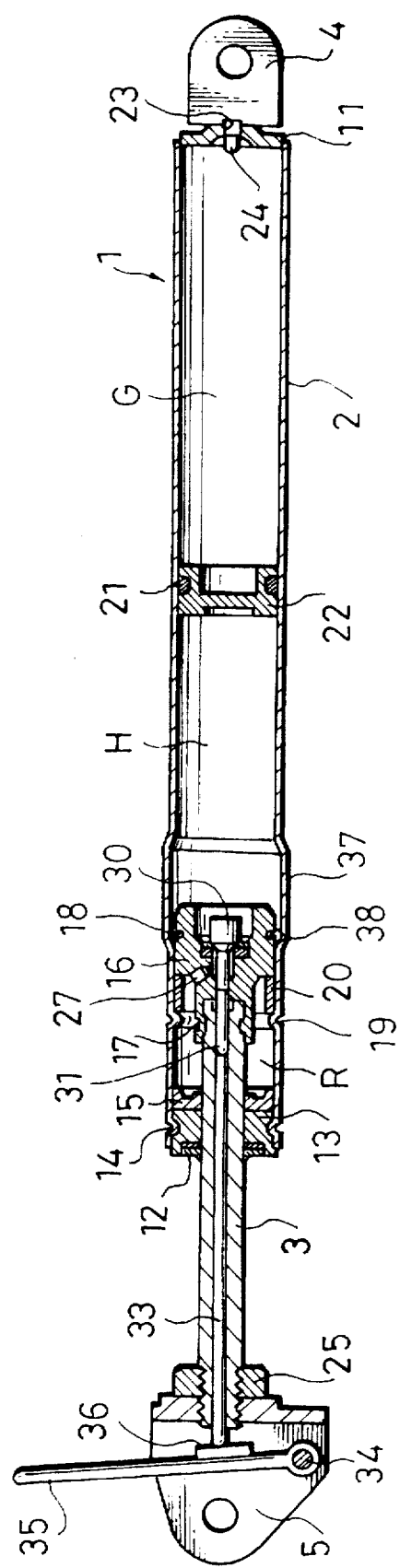
FIG. 2 is a longitudinal sectional front view showing one embodiment of the back-rest angle adjusting apparatus.

The proximal end of the cylinder 2 is closed by mounting a bottom cap 11 having the mounting member 4 by welding, as shown in FIG. 2.

Further, the aforesaid extreme end is closed oil-tightly by mounting by means of a roll-caulking 14 a rod guide 13 provided with a dust seal 12 on the outer surface side thereof and disposing a seal 15 on the inner surface side thereof.

The piston rod 3 is telescopically inserted into the cylinder 2 extending through the dust seal 12, the rod guide 13 and the seal 15 on the extreme end side from the outside.

A piston 16 is integrally provided by a caulking 17, positioned within the cylinder 2 and on the proximal end of the piston rod 3.

The piston 16 is positioned rightward from the position shown in FIG. 2 in the normal state whereby a seal member 18 fitted in the outer periphery comes into sliding contact with the original inner wall portion of the cylinder 2, the piston 16 defining the interior of the cylinder 2 into a rod side chamber R and a head side chamber H.

On the other hand, the rod side chamber R is interiorly provided with a stopper 20 by controlling its position by the roll-caulking 19 formed in the cylinder 2.

The stopper 20 abuts on the piston 16 at the most expanded position (the state shown in FIG. 2) of the back-rest angle adjusting apparatus 1 to inhibit a further expanding operation to thereby secure the minimum fitting length between the cylinder 2 and the piston rod 3.

A free piston 22 having a seal member 21 fitted in the outer periphery thereof comes in sliding contact with the inner wall of the cylinder and is slidably disposed in the head side chamber H.

The free piston 22 defines a gas chamber G at the proximal end of the head side chamber H in the cylinder 2 by sealing operation of the seal member 21 fitted in the outer periphery thereof.

A gas injecting hole 23 is bored in the bottom cap 11 for closing the proximal end of the cylinder 2 in order to seal pressure gas into the gas chamber G.

The gas injecting hole 23 is permanently closed by a plug 24 provided on the mounting member 4 when the mounting member 4 is welded to the bottom cap 11 after the pressure gas has been injected into the gas chamber G.

The mounting member 4 is mounted by welding to the bottom cap 11 for closing the proximal end of the cylinder 2 as described above, whereas the mounting member 5 is threadedly mounted on the extreme end of the piston rod 3 and thereafter mounted by being fixed by a lock nut 25.

Figure 3:
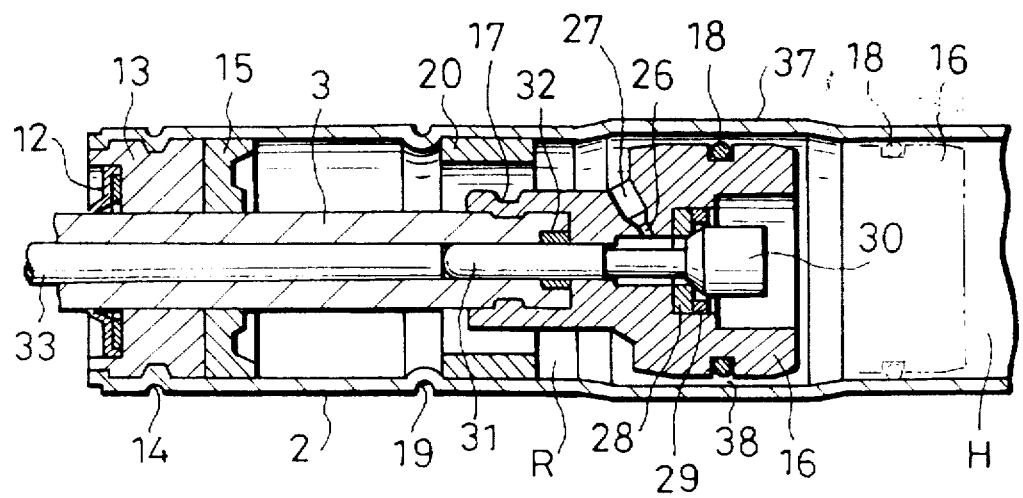
FIG. 3 is a partial longitudinal sectional front view showing in detail in longitudinal section only main parts of the back-rest angle adjusting apparatus.

As shown in detail in FIG. 3, the piston 16 is provided with a passage 27 having an orifice extending through the piston 16.

The passage 27 communicates with the rod side chamber R and the head side chamber H within the cylinder 2 through the orifice 26.

In an open portion to the head side chamber H in the passage 27 is arranged a valve seat 28 made of rubber or plastic while being fixed by means of a keep plate 29 pressurized into the piston 16.

The piston 16 is provided, opposite to the valve seat 28, with an opening and closing valve 30 for opening and closing an open end to the head side chamber H of the passage 27 while moving to and from the valve seat 28.

The opening and closing valve 30 is provided with a rod 31 expanding toward the passage 27 side, the rod 31 extending through a seal 32 provided on the piston rod 3 and extending into a hollow portion of the piston rod 3.

With this, in the opening and closing valve 30, a pressure receiving area thereof on the rod 31 side is reduced by a sectional area portion of the rod 31 than that on the opposite side.

Accordingly, the valve 30 is urged against the valve seat 28 under the working oil pressure of the rod side chamber R and the head side chamber H pressed through the free piston 22 (see FIG. 2) by the gas pressure of the gas chamber G and is kept in the closed state.

Turning back to FIG. 2, an operating rod 33 is slidably inserted, into the hollow portion of the piston rod 3, over the extreme end of the rod 31 of the opening and closing valve 30 from the outside.

The projecting end of the operating rod 33 to the outside contacts a pad plate 36 provided on the lateral face of an operating lever 35 supported on the mounting member 5 using a shaft 34 so that the opening and closing valve 30 may be opened and closed by operating the operating lever 35 from the outside.

In the present embodiment, the inner wall portion of the cylinder 2 opposite to the piston 16 in the vicinity of the expanded end of the back-rest angle adjusting apparatus 1 is inflated outward over the entire periphery to form an enlarged diameter portion 37.

It is to be noted that the enlarged diameter portion may be formed directly by shaving the inner wall of the desired portion of the cylinder 2, for example.

The enlarged diameter portion 37 is constructed so as to form a bypass passage 38 relative to the inner wall of the cylinder 2 when the seal member 18 fitted in the outer periphery of the piston 16 is positioned at the portion of the enlarged diameter portion 37 on the cylinder 2 side.

The back-rest angle adjusting apparatus 1 according to the present embodiment constructed as described above performs the operation as described below to adjust an angle of the back-rest 7.

Referring to FIGS. 1 to 3, it is now assumed that the piston 16 is at a position (for example, a position indicated by the chain line in FIG. 3) deviated from the enlarged diameter portion 37 on the cylinder 2 side, and in this state, the opening and closing valve 30 is kept in the closed state and the back-rest 7 is locked at a desired angle by the back-rest angle adjusting apparatus 1.

In the case where the back-rest 7 is laid down backward from the aforementioned state, an occupant is seated on the seat and operates the operating lever 35 so that the back-rest 7 is pushed by his (her) back while opening the opening and closing valve 30. The back-rest 7 pushed by the back exerts the compressive force on the cylinder 2 of the back-rest angle adjusting apparatus 1 through the arm 9.

This force causes the cylinder 2 to extrude the working oil within the head side chamber H toward the rod side chamber R while applying the flow resistance by the orifice 26 from the passage 27 of the piston 16 to operate in the compressive direction slowly at a fixed speed.

At this time, the free piston 22 also operates simultaneously while compressing the pressure gas within the gas chamber G to compensate for a surplus portion of working oil in the quantity corresponding to an entry volume portion of the piston rod 3 with respect to the cylinder 2.

Thereby, the back-rest angle adjusting apparatus 1 operates for compression, and the back-rest 7 is laid down backward of the back-rest 7.

When the back-rest 7 is inclined at a desired angle, the operating lever 35 is released from its operation. Then, the opening and closing valve 30 is automatically closed by the pressure of working oil within the cylinder 2 caused by the gas pressure in the gas chamber G.

Thus, the back-rest angle adjusting apparatus 1 returns to the locked state so that the back-rest 7 stops while keeping the desired inclined angle.

On the contrary, in the case where the back-rest 7 is raised forward, in the state where the back is moved away from the back-rest 7, the operating lever 35 is operated to open the opening and closing valve 30.

Then, the cylinder 2 is pushed by the gas pressure in the gas chamber G to extrude the working oil within the rod side chamber R toward the head side chamber H while applying the flow resistance by the orifice 26 from the passage 27 of the piston 16, to operate in the expanding direction slowly at a fixed speed.

Also at this time, the free piston 22 is pushed by the pressure gas in the gas chamber G and operates simultaneously while inflating the gas chamber G, to compensate for a short portion of working oil in the quantity corresponding to a withdrawal volume portion of the piston rod 3 with respect to the cylinder 2.

Thereby, the back-rest angle adjusting apparatus 1 operates for expansion, and the back-rest 7 is raised forward through the arm 9.

When the back-rest 7 is raised at a desired angle, the operating lever 35 is released from its operation. Then, the opening and closing valve 30 is automatically closed by the pressure of working oil within the cylinder 2 caused by the gas pressure in the gas chamber G, in the same manner as the previous tilting operation of the back-rest 7.

Thus, the back-rest angle adjusting apparatus 1 returns to the locked state so that the back-rest 7 stops while keeping the desired raised angle.

On the other hand, it is assumed that when the back-rest 7 is operated to be raised, the back-rest 7 is raised to a position opposite to the seal member 18 fitted in the outer periphery of the piston 16 by the enlarged diameter portion 37 of the cylinder 2 in the back-rest angle adjusting apparatus 1.

In this case, when the enlarged diameter portion 37 in the cylinder 2 is opposed to the seal member 18 in the outer periphery of the piston 16, a bypass passage 38 is formed between the inner wall of the cylinder 2 and the outer periphery of the seal member 18 on the piston 16 side.

Thereby, from this time, the rod side chamber R is caused to communicate with the head side chamber H through the bypass passage 38.

Therefore, the back-rest angle adjusting apparatus 1 is freely expanded and compressed at a relatively high speed as compared with the previous normal back-rest angle adjustment, within the aforementioned range, irrespective of the opening and closing operation of the opening and closing valve 30, that is, irrespective of the flow resistance of the orifice 26, so that the back-rest 7 is raised and tilted.

According to the back-rest angle adjusting apparatus 1 in the present embodiment, in the case where the back-rest 7 is adjusted in angle within the range of a normal back-rest angle adjusting range $\theta$ in FIG. 1, the original inner wall portion other than the enlarged diameter portion 37 of the cylinder 2 comes in sliding contact with the seal member 18 of the piston 16 for the expansion and compression operation.

Accordingly, within the range of a normal back-rest angle adjusting range $\theta$, the opening and closing valve 30 of the piston 16 is operated to be opened and closed through the operating lever 35 whereby the back-rest 7 is steplessly adjusted while limiting the tilting and raising speeds by the orifice 26, in the same manner as the conventional back-rest angle adjusting apparatus.

On the other hand, in the case where the back-rest 7 is raised forward toward an upright end position B beyond a preferable angle position A when most raised in the normal back-rest angle adjusting range, the enlarged diameter portion 37 on the cylinder 2 side is opposed to the seal member 18 of the piston 16 to form the bypass passage 38 therebetween.

As a result, within the angle adjusting range $\alpha$ in FIG. 1, the back-rest 7 operates to the upright end position B at a higher speed than that of the case of the previous normal back-rest angle adjusting range $\theta$ irrespective of the opening and closing operation of the opening and closing valve 30 to quickly release locking for turning the seat 6 or widen the passage width relative to the rear seat 6.

When the back-rest 7 is returned from the upright end position B, the bypass passage 38 is operated, while the back-rest 7 is inclined to the preferable angle position A when most raised in the normal back-rest angle adjusting range, so that the back-rest 7 operates lightly and quickly.

When reaching the angle position A, the bypass passage 38 is closed by the seal member 18 of the piston 16 so that the back-rest 7 automatically stops.

Figure 4:
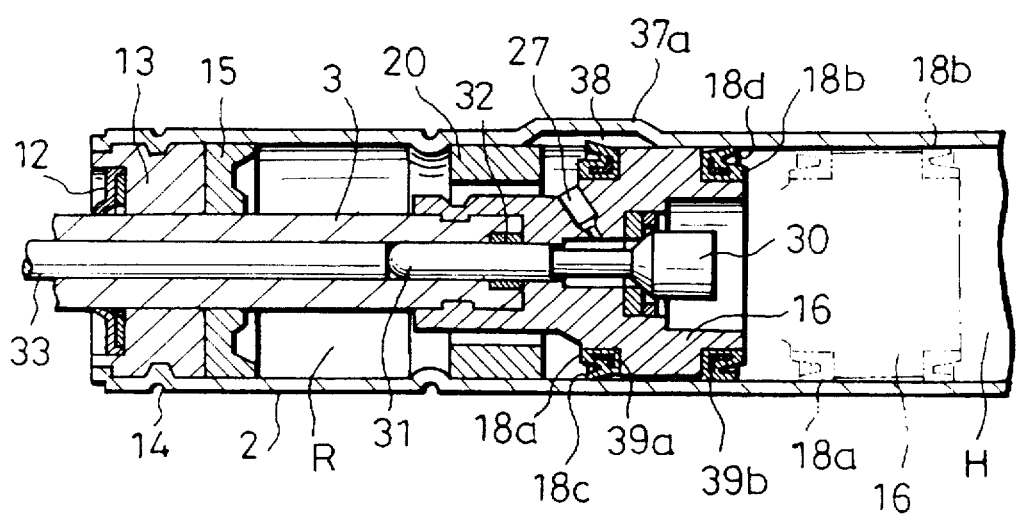
FIG. 4 partial longitudinal sectional front view showing in detail in longitudinal section only main parts of the back-rest angle adjusting apparatus according to another embodiment.

FIG. 4 shows another embodiment showing only main parts of the present invention in detail, in the same manner as FIG. 3 previously mentioned.

The second embodiment shown in FIG. 4 is not different from the first embodiment previously mentioned in construction except that a seal member fitted in the outer periphery of the piston 16 and an enlarged diameter portion in the cylinder 2 are different in construction.

Accordingly, only the difference as just mentioned above will be explained with reference to FIG. 4.

That is, in the embodiment shown in FIG. 4, two U-shaped seal members 18a and 18b provided with insert metals 39a and 39b are disposed in the outer periphery of the piston 16 with lip portions 18c and 18d directed outward.

The seal members 18a and 18b are seals with insert metals because mounting thereof on the piston 16 is facilitated. Normal U-shaped seals without insert metals may be mounted within an annular groove provided in the outer periphery of the piston 16.

The seal members 18a and 18b intercept only the flow of working oil which tends to flow through the seal members 18a and 18b from the side opposite to the lip portions 18c and 18d and allows the flow of working oil in the opposite direction with the lip portions 18c and 18d reduced in diameter.

In this manner, these seal members 18a and 18b function as a one-way seal having a sealing function only in one direction, and these two seal members 18a and 18b cooperate with each other to fulfill their function as piston seals.

On the other hand, a suitable number of enlarged diameter portions 37a (one in FIG. 4) are formed in the inner wall portion of the cylinder 2 opposed to the seal member 18a on the rod side of the piston rod 16 in the vicinity of the expansion end with the inner wall inflated outward in an axial direction.

The enlarged diameter portion 37a is constructed so that when it is positioned at the portion of the piston 16, the enlarged diameter portion 37a is positioned to be opposed to only the seal member 18a on the rod side to thereby form the bypass passage 38 between the seal member 18a and the inner wall of the cylinder 2.

Thereby, also in the case of the embodiment shown in FIG. 4, in the normal back-rest angle adjusting range in which the original inner wall portion of the cylinder 2 deviated from the enlarged diameter portion 37a comes into sliding contact with the seal members 18a and 18b of the piston 16, the seal members 18a and 18b cooperate with each other, without opening the opening and closing valve 30, and the angle of the back-rest 7 is steplessly adjusted while limiting the tilting and raising speed by the orifice 26, in the same manner as the case of the previous embodiment.

In the case where the back-rest 7 is raised further forward from the preferable angle position A when most raised in the normal back-rest angle adjusting range, the enlarged diameter portion 37a of the cylinder 2 is opposed to the portion of the seal member 18a on the rod side in the piston 16 to form the bypass passage 38.

As a result, also in this case, the back-rest 7 operates to the upright end position B at a higher speed than that of the case of the previous normal back-rest angle adjusting range irrespective of the opening and closing operation of the opening and closing valve 30 to quickly release locking for turning the seat 6 or widen the passage width relative to the rear seat 6, in the same manner as the case of the first embodiment.

According to the embodiment shown in FIG. 4, when the back-rest 7 is returned from the above-described state, the flow of working oil from the head side chamber H toward the rod side chamber R is impeded by the lip portion 18d of the seal member 18b on the head side.

Therefore, also in this range, the opening and closing valve 30 can be operated to be opened and closed through the operating lever 35 to adjust the angle of the back-rest 7.

According to the first and second embodiment so far described, the back-rest 7 can be raised quickly at a fast speed merely by applying an external force to the back-rest 7 without operating the operating lever 35 to open the opening and closing valve 30 on the expansion end side of the back-rest angle adjusting apparatus 1.

Further, according to the second embodiment, when the back-rest 7 is returned on the expansion end side of the back-rest angle adjusting apparatus 1, the angle can be adjusted using the operating lever 35.

However, even so, when the expansion speed on the expansion end side of the back-rest angle adjusting apparatus 1 is excessively fast, a severe shock occurs at the expansion end.

To prevent the occurrence of the shock, in the first and second embodiment, a passage area of the bypass passage 38 formed by the enlarged diameter portions 37 and 37a of the cylinder 2 and the seal members 18 and 18a provided on the piston 16 is adequately determined to select the flow resistance of working oil flowing thereto so as to adequately control the expansion speed at the expansion end side of the back-rest angle adjusting apparatus 1.

With this, the expansion speed at the expansion end side of the back-rest angle adjusting apparatus 1 can be controlled to some extent to suppress the occurrence of the shock to be low. However, this is sometimes still insufficient according to uses by the mere provision of such shock prevention means.

Figure 5:
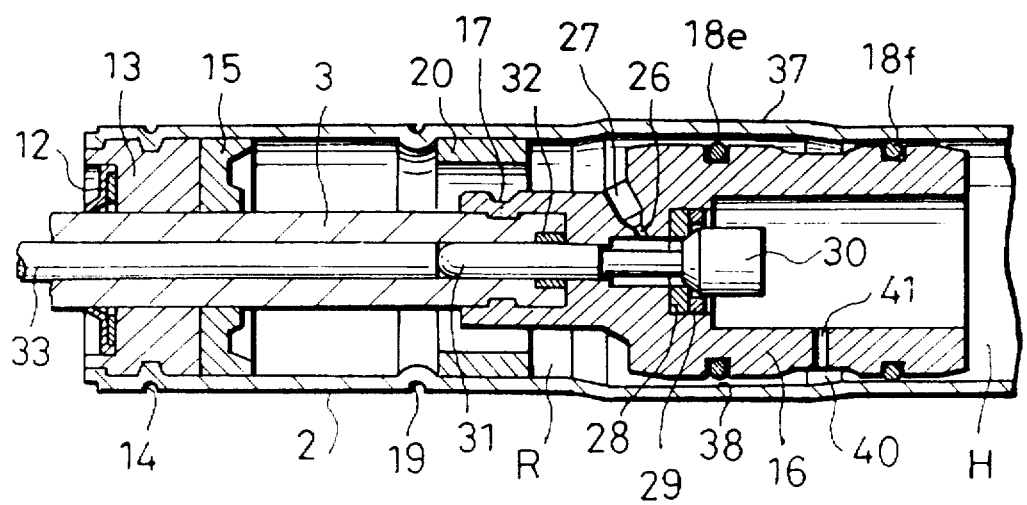
FIG. 5 is a partial longitudinal sectional front view showing in detail in longitudinal section only main parts of the back-rest angle adjusting apparatus according to a further embodiment.

FIG. 5 shows a further embodiment of the present invention provided with the construction suitable for use in such a case as described.

That is, in the third embodiment shown in FIG. 5, two seal members 18e and 18f are disposed in the outer periphery of the piston 16, in the same manner as the second embodiment shown in FIG. 4 as described above.

However, the above-described seal members 18e and 18f are in the form of normal piston seals which have no seal function only in one direction, unlike the case of the second embodiment but have seal function in dual direction, these two seal members 18e and 18f forming an intermediate chamber 40 therebetween.

The intermediate chamber 40 is caused to communicate at all times with the head side chamber H within the cylinder 2 through a restrictive orifice 41.

On the other hand, when the enlarged diameter portion 37 on the cylinder 2 side is positioned at the portion of the piston 16, the enlarged diameter portion 37 is positioned opposite to only the seal member 18e on the rod side.

Thereby, the enlarged diameter portion 37 and the seal member 18e form the bypass passage 38 between the inner wall of the cylinder 2 and the seal member 18e, and the rod side chamber R and the head side chamber H within the cylinder 2 are caused to communicate with each other through the bypass passage 38 and the restrictive orifice 41 provided on the piston 16.

Thus, also in the third embodiment shown in FIG. 5, in the normal back-rest angle adjusting range θ in which the original inner wall portion of the cylinder 2 deviated from the enlarged diameter portion 37 comes into sliding contact with the seal members 18e and 18f of the piston 16, the angle of the back-rest 7 is steplessly adjusted while limiting the tilting and raising speed of the orifice 26.

In the angle adjusting range α between the preferable angle position A when most raised in the normal back-rest angle adjusting range and the upright end position B, the enlarged diameter portion 37 of the cylinder 2 is slidably moved while opposing to the portion of the seal member 18e on the rod side in the piston 16 to form the bypass passage 38 between the enlarged diameter portion 37 and the seal member 18e on the rod side.

As a result, the rod side chamber R and the head side chamber H are caused to communicate with each other through the bypass passage 38, the intermediate passage 40 and the restrictive orifice 41.

Accordingly, within the angle adjusting range α, the back-rest 7 is raised and tilted irrespective of the opening and closing operation of the opening and closing valve 30 and at a fixed fast speed controlled by the restrictive orifice 41 as compared with the normal back-rest angle adjusting time.

As a result, the back-rest 7 is quickly operated to release locking for turning the seat 6 or to widen the passage width relative to the rear seat 6.

Figure 6:
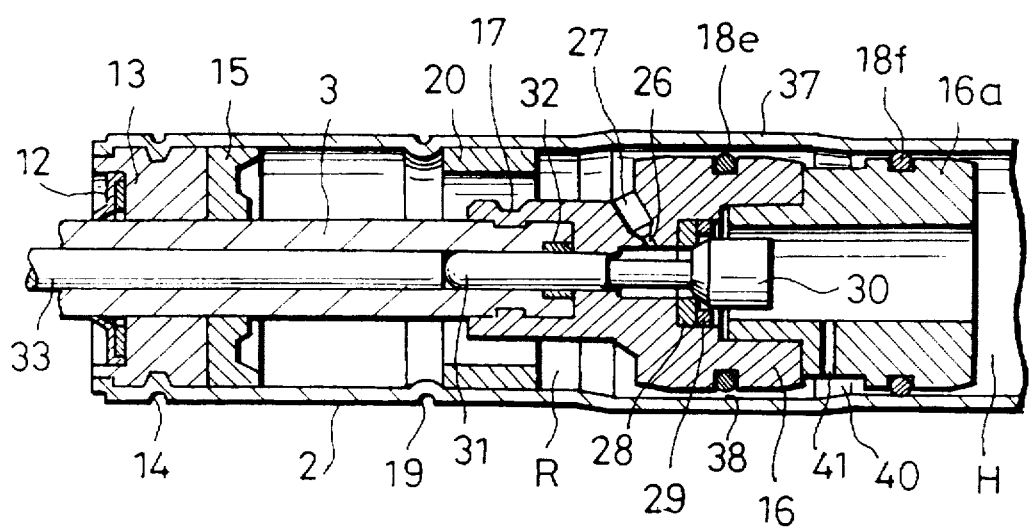
FIG. 6 is a partial longitudinal sectional view showing a modification of the above-described apparatus.

FIG. 6 shows a modification of the embodiment shown in FIG. 5. In this embodiment, two parts, i.e., the piston 16 as a body portion and the guide member 16a as an extension portion constitute a piston.

The guide member 16a is connected oil tightly to the piston 16 using means such as press fitting, and a seal member 18f and a restrictive orifice 41 are provided on the guide member 16a side. According to the above-described arrangement, the piston 16 as a standard part can be used without making the piston 16 into a special shape as in the embodiment shown in FIG. 5.

Further, while in FIGS. 5 and 6, two seal members 18e and 18f are used on the piston 16 side, it is to be noted that in the case where an unevenness to some extent is allowed in the expansion compression speed in the vicinity of the expansion end of the back-rest angle adjusting apparatus 1, the seal member 18f may be omitted, and a small amount of leak of working oil may be allowed therefrom.

Further, as shock prevention means at the expansion end of the back-rest angle adjusting apparatus 1, the bypass passage 38 and the restrictive orifice 41 by way of the enlarged diameter portions 37 and 37a so far mentioned may not be used but the outer peripheral portion on the rod side of the piston 16 on the expansion end side passes by the enlarged diameter portions 37 and 37a and are fitted in the cylindrical portion of the cylinder 2 whereby so-called oil lock means which causes working oil in the rod side chamber R to flow from a fitting clearance therebetween may be used or used in combination.

Although not shown particularly, needless to say, the partial enlarged diameter portion 37a used in the second embodiment shown in FIG. 4 may be used for the cylinder 2 in other embodiments and the modification, or conversely, the circumferential enlarged diameter portion 37 may be used for the cylinder 2 shown in FIG. 4.

As described above, according to the invention of claim 1, the raising speed in case where the back-rest is raised further forward from the preferable angle position when most raised in the back-rest angle adjusting range is made faster than the normal back-rest angle adjusting time so that the back-rest can be raised quickly to the upright end position, irrespective of the limitation of the operating speed at the time of the normal tilting and raising of the back-rest.

Also when the back-rest is laid down from the upright end position, an occupant is merely seated on the seat to lean his back against the back-rest whereby the back-rest can be quickly returned to the preferable angle position when most raised.

Also in the invention of claim 2, similarly, the raising speed when the back-rest is raised further forward from the preferable angle position when most raised in the back-rest angle adjusting range is made faster than the normal back-rest angle adjusting time so that the back-rest can be raised quickly to the upright end position, irrespective of the limitation of the operating speed at the time of the normal tilting and raising of the back-rest.

Moreover, according to this, even in the operating range in which the back-rest at the upright end position is returned to the preferable angle position when raised in the back-rest angle adjusting range, the angle of the back-rest can be steplessly adjusted by using the operating lever.

Furthermore, when the enlarged diameter portion is deviated from the piston due to the compressive operation of the piston and the normal portion enters the piston, the normal portion of the cylinder enters from the back of the seal member on the rod side in the piston, and therefore, the resistance at the time of entry is small, and accordingly, the durability of the piston seal is remarkably enhanced.

On the other hand, according to the invention of claim 3, in addition to the effect of claim 1 described above, the operating speed when the back-rest is raised and tilted beyond the normal back-rest angle adjusting range can be adequately controlled by selecting a diameter of the restrictive orifice provided in the piston.

Further, according to the inventions of claims 4 and 5, in addition to the above-described effects, the enlarged diameter portion for the bypass passage formed in the cylinder of the back-rest adjusting apparatus can be easily prepared using drawing processing means such as bulging.

What is claimed is:

1. A back-rest angle adjusting apparatus for a seat, the device comprising:

seat;

a backrest of said seat a cylinder;

a piston slidably received in said cylinder;

a piston rod having one end coupled to said piston and another end disposed retractably outside said cylinder, said piston defining a rod side chamber and a head side chamber within said cylinder and having a passage for causing both said rod side chamber and a head side chamber to communicate with each other and an opening and closing valve for opening and closing said passage, said piston rod being always urged in an expanding direction by gas pressure of a gas chamber defined in the cylinder, an outer end of said piston and a proximal end of said cylinder being mounted between said seat and said backrest of said seat, and an angle of said back-rest is adjusted by an opening and closing operation of said closing valve, said cylinder having an enlarged diameter portion formed in an inner cylinder wall portion opposed to said piston in a vicinity of a most expanded position of said piston, and a bypass passage for causing said rodside chamber and said head side chamber to communicate with each other formed between an inner wall of said enlarged diameter portion and an outer periphery of said piston when said enlarged diameter portion is opposed to said piston.

2. The back-rest angle adjusting apparatus according to claim 1 wherein a portion adjacent to said expansion end of the cylinder is over an entire periphery inflated outward to constitute the enlarged diameter portion.

3. The back-rest angle adjusting apparatus according to claim 1 wherein a portion adjacent to said expansion end of the cylinder is partly inflated outward to constitute the enlarged diameter portion.

4. A back-rest angle adjusting apparatus for a seat, the device comprising:

seat;

a backrest of said seat a cylinder;

a piston slidably received in said cylinder;

a piston rod having one end coupled to said piston and another end disposed retractable outside said cylinder, said piston defining a rod side chamber and a head side chamber within said cylinder and having a passage for causing both said rod side chamber and a head side chamber to communicate with each other and an opening and closing valve for opening and dosing said passage, said piston rod being always urged in an expanding direction by gas pressure of a gas chamber defined in the cylinder, an outer end of said piston and a proximal end of said cylinder are mounted between said seat and said backrest of said seat, and an angle of said back-rest is adjusted by an opening and closing operation of said closing valve, two one-way seal members having a seal function being juxtaposed in a spaced relation from outward to inward on an outer peripheral surface of said piston, an enlarged diameter portion being provided in an inner wall portion of said cylinder, opposed to a seal member, of said seal members, positioned on a rod side adjacent to an expansion end of the back-rest angle adjusting apparatus, a bypass passage being formed between an inner wall of the cylinder and said seal member on said rod side of the piston when said enlarged diameter portion on the cylinder side is opposed to said seal member on said rod side of the piston, and said rod side chamber in said cylinder defined by the piston is caused to communicate with a head side chamber in the cylinder through the seal member, of said seal members, on a head side of the piston from said bypass passage.

5. The back-rest angle adjusting apparatus according to claim 4 wherein a portion adjacent to said expansion end of the cylinder is over an entire periphery inflated outward to constitute the enlarged diameter portion.

6. The back-rest angle adjusting apparatus according to claim 4 wherein a portion adjacent to said expansion end of the cylinder is partly inflated outward to constitute the enlarged diameter portion.

7. A back-rest angle adjusting apparatus for a seat, the device comprising:

seat;

a backrest of said seat a cylinder;

a piston slidably received in said cylinder;

a piston rod having one end coupled to said piston and another end disposed retractably outside said cylinder, said piston defining a rod side chamber and a head side chamber within said cylinder and having a passage for causing both said rod side chamber and a head side chamber to communicate with each other and an opening and closing valve for opening and dosing said passage, said piston rod being always urged in an expanding direction by gas pressure of a gas chamber defined in the cylinder, an outer end of said piston and a proximal end of said cylinder are mounted between said seat and said backrest of said seat, and an angle of said back-rest is adjusted by an opening and closing operation of said closing valve, a seal member and an intermediate chamber being juxtaposed from a rod side to a head side in an outer periphery of said piston, said intermediate chamber communicating with said head side chamber in said cylinder defined by said piston through a restrictive orifice provided in said piston, an enlarged diameter portion being provided in an inner wall portion of said cylinder opposed to a seal member of said piston adjacent to an expansion end of the back-rest angle adjusting apparatus, a bypass passage being formed between said inner wall of said cylinder and said seal member of said piston when said enlarged diameter portion on said cylinder side is opposed to said seal member of said piston, and a rod side chamber and a head side chamber in said cylinder defined by said piston are caused to communicate with each other through said bypass passage, and said intermediate chamber and said restrictive orifice provided in said piston.

8. The back-rest angle adjusting apparatus according to claim 7 wherein a portion adjacent to said expansion end of the cylinder is over an entire periphery inflated outward to constitute the enlarged diameter portion.

9. The back-rest angle adjusting apparatus according to claim 7 wherein a portion adjacent to said expansion end of the cylinder is partly inflated outward to constitute the enlarged diameter portion.

* * * * *